Patented Dec. 6, 1938

2,139,111

UNITED STATES PATENT OFFICE 2,139,111

PROCESS FOR THE PRODUCTION OF BUTYL ALCOHOL BY FERMENTATION

Edwin H. Carnarius and Winfred N. McCutchan, Peoria, Ill., assignors to Commercial Solvents Corporation, Terre Haute, Ind., a corporation of Maryland No Drawing. Application February 8, 1937, Serial No. 124,686

8 Claims. (Cl. 195—44)

Our invention relates to the production of butyl alcohol and other valuable products by the fermentation of sugar-containing solutions. More specifically our invention relates to the production of normal butyl alcohol, acetone, and ethyl alcohol by the fermentation of sugar solutions by means of two new strains of bacteria described herein.

It has previously been known that sugar solutions could be fermented by means of certain types of butyl alcohol producing bacteria, and this type of fermentation has been found to be superior in a number of respects to the starch fermentation by means of bacteria of the type *Clostridium acetobutylicum* (Weizmann) first commercially employed in this field. We have now discovered two new strains of the essentially sugar-fermenting bacteria which are particularly advantageous from the standpoint of commercial scale operation and from the standpoint of the ratio of products obtainable. These and other advantages of our new bacteria will be apparent from the following description and specific examples.

The new bacteria of our present invention will be described by means of appropriate characteristics of the descriptive chart of the Society of American Bacteriologists, and by other distinguishing characteristics:

Name of organism: *Clostridium saccharo-butyl-acetonicum - liquefaciens-gamma*

Source: Soy beans

I. Morphology
   1. Vegetative cells
      Medium used: Potato glucose medium (300 gm. potato, moist weight, 10 gm. glucose, 1 gm. ammonium sulfate, 3 gm. calcium carbonate per liter)
      Incubation: 20 hours at 30° C.
      Stain used: Negative nigrosin, without heat
      Form: Short and long rods
      Arrangement: Single and chains
      Usual limits of length: 3.8–10.0$\mu$; of diameter 1.3–2.6$\mu$
      Size of majority: 6.3 x 1.8$\mu$
      Ends: Rounded
   2. Sporangia: Present
      Medium used: Potato glucose medium (cf. I, 1 above)
      Incubation: 36 hours at 30° C.
      Stain used: Negative nigrosin, without heat
      Form: Spindled and clavate
   3. Endospores: Present
      Medium used: Potato glucose medium (cf. I, 1 above)
      Incubation: 72 hours at 30° C.
      Stain used: Negative nigrosin, without heat
      Location of endospores: Subterminal to terminal
      Form: Cylindrical with rounded ends, some oval
      Usual limits of length: 2.0–3.9$\mu$; of diameter 1.1–1.8$\mu$
      Size of majority: 1.4 x 2.8$\mu$
   4. Motility
      Medium used: Glucose broth (5 gm. peptone, 3 gm. beef extract, 10 gm. glucose per liter)
      Incubation: 20 hours at 30° C.
      Motility: Motile
      Medium used: Nutrient agar (agar 17 gm. glucose 20 gm., molasses 8 gm., peptone 5 gm. beef extract 3 gm., ammonium sulfate 1 gm. per liter)
      Incubation: 40 hours at 30° C.
      Motility: Motile
   5. Flagella: Present
      Medium used: Molasses mash (sugar 75 gm., calculated as sucrose, supplied in the form of Cuban molasses, ammonium sulfate 3.8 gm., calcium carbonate 4.3 gm. and calcium acid phosphate 0.2 gm. per liter of mash)
      Incubation: 22 hours at 30° C.
      Stain used: Casares-Gil
      Attachment: Peritrichous
   6. Irregular forms: Present
      Medium used: Potato glucose medium (cf. I, 1 above)
      Incubation: 72 hours at 30° C.
   7. Staining Reactions
      (a) Gram stain
         Medium used: Potato glucose medium (cf. I, 1 above)
         Incubation: 30° C.
         Stain used: Kopeloff-Beerman modification
         Stain: Positive-variable
      (b) Iodine stain:
         Medium used: Nutrient agar (cf. I, 4 above)
         Incubation: 48 hours at 30° C.
         Granulose: Positive II. Cultural characteristics
   1. Agar colonies
      Medium used: Nutrient agar (cf. I, 4 above)
      Incubation: 48 hours at 30° C.
      Form: Circular to irregular
      Surface: Smooth, some rough
      Edge: Entire, some lobar-lobulate
      Elevation: Convex to pulvinate
      Optical character: Opaque to opalescent 2. Agar stroke
   Medium used: Nutrient agar (cf. I, 4 above)
   Incubation: 96 hours at 30° C.
   Growth (anaerobic): Abundant
   Form: Spreading
   Luster: Glistening
   Chromogenesis: None to light cream
   Odor: Butyric and butylic
   Consistency: Mucid
   Change in color of medium: None
3. Nutrient broth
   Medium: Nutrient broth (5 gm. peptone, 3 gm. beef extract per liter)
   Incubation: 30° C.
   Surface growth (72 hours): None
   Clouding (72 hours): Slight
   Odor (72 hours): None
4. Gelatin stab
   Medium: Nutrient gelatin (gelatin 120 gm. glucose 10 gm., peptone 5 gm., beef extract 3 gm. per liter)
   Incubation: 24° C.
   Growth (24 hours): Best below surface to bottom
   Line of puncture (24 hours): Slight liquefaction with growth apparent only in liquid portion
   Liquefaction (3 days): Complete
   Change in color of medium: None
5. Potato stroke
   Medium: Sterilized potato
   Incubation: 96 hours at 30° C.
   Growth (anaerobic): Abundant
   Form: Spreading, sinking into medium
   Luster: Glistening
   Chromogenesis: None to light cream
   Odor: Butyric and butylic
   Consistency: Mucid
   Change in medium: Liquefaction III. Physiological characteristics
1. Temperature relations
   Optimum fermentation temperature: 29 to 31° C.
2. Relation to reaction of medium
   Optimum final pH: 5.6–6.2
3. Chromogenesis
   Nutrient agar: None to light cream
   Nutrient gelatin: None
   Potato: None to light cream
4. Production of indole
   Medium used: Glucose tryptophane (glucose 2.5 gm., tryptophane 1.0 gm. per liter)
   Incubation: 96 hours at 36° C.
   Test used: p-Dimethylaminobenzaldehyde
   Indole: Absent
5. Production of hydrogen sulphide
   Medium used: Lead acetate agar (agar 15 gm., peptone "Bacto tryptone" 20 gm., glucose 10 gm., lead acetate 0.2 gm. per liter)
   Incubation: 72 hours at 30° C.
   Hydrogen sulphide: Absent, or present only in traces
6. Relation to oxygen
   (a) Medium used: Nutrient agar (cf. I, 4 above)
       Incubation: 48 hours at 30° C.
       Growth (aerobic incubation): Absent
       Growth anaerobic incubation): Abundant
   (b) Medium used: Potato glucose medium (cf. I, 1 above) in deep tubes, freshly steamed
       Incubation: 24 hours at 30° C.
       Growth (aerobic incubation): Abundant
       Growth (anaerobic incubation): Abundant
7. Litmus milk
   Incubation: 30° C.
   Reaction (3 days): Acid
   Curd (10 days): Acid curd
   Peptonization (15 days): Very slight
   Reduction of litmus (2 days): Reduced
8. Nitrate reduction
   Medium: Asparagin-sodium citrate-nitrate medium (Asparagin 1 gm. sodium citrate 8.5 gm. potassium nitrate 1 gm. monopotassium phosphate 1 gm., magnesium sulphate 1 gm., calcium chloride 0.2 gm. per liter)
   Incubation: 7 days at 30° C.
   Test used: Alpha-naphthylamine-sulfanilic acid test or nitrites
   Reduction: Variable
9. Fermentation reactions
   (a) Acid and gas production
       Medium used: Nutrient broth (nutrient broth of I, 4 plus 10 gm. of the carbohydrate or alcohol to be tested, per liter)

| Carbohydrate or alcohol | Acid production | Gas production |
|---|---|---|
| Arabinose | ++ | ++ |
| Rhamnose | − | − |
| Xylose | ++ | ++ |
| Glucose | +++ | +++ |
| Fructose | +++ | +++ |
| Galactose | +++ | +++ |
| Mannose | ++ | +++ |
| Lactose | ++ | ++ |
| Sucrose | ++ | +++ |
| Maltose | ++ | +++ |
| Raffinose | +++ | ++ |
| Melezitose | − | − |
| Corn starch | +++ | +++ |
| Soluble starch | +++ | ++ |
| Inulin | +++ | ++ |
| Dextrin | ++ | ++ |
| Glycogen | ++ | ++ |
| Glycerol | − | − |
| Erythritol | − | − |
| Mannitol | − | − |
| Sorbitol | − | − |
| Dulcitol | − | − |
| Salicin | +++ | ++ |
| Alpha-methyl glucoside | + | +++ |

−Negative; +moderate; ++decided; +++abundant.

(b) Molasses fermentation
       Medium used: Cuban molasses (sucrose equivalent) 75 gm., ammonium sulphate 3.8 gm., calcium carbonate 4.1 gm., and calcium acid phosphate 0.2 gm. per liter
       Yield range: 27–33% of sugar
       Average yield: 29–31% of sugar
       Butyl alcohol ratio: 58–69%
       Acetone ratio: 29–36%
       Ethyl alcohol ratio: 2–6%
   (c) Soluble starch fermentation
       Medium used: Soluble starch 50 gm., peptone 5 gm., beef extract 3 gm., ammonium sulphate 1 gm., and calcium carbonate 4 gm., per liter
       Yield range: 20–28% of starch
       Average yield: 25–27% of starch (d) Nutrient corn mash fermentation
    Medium used: Corn meal 70 gm., ammonium sulphate 3 gm., and calcium carbonate 4 gm. per liter
    Yield range: 20-28% of starch
    Average yield: 22-25% of starch
(e) Corn mash fermentation
    Medium used: Corn meal 70 gm. per liter
    Yield range: 0-5% of starch
    Average yield: 0-1% of starch The following description of the second strain of bacteria of the present invention will be given only as to the characteristics which differ from those reported above for *Clostridium saccharo-butyl-acetonicum liquefaciens-gamma.*

Name of organism: *Clostridium saccharo-butyl-acetonicum - liquefaciens - delta*

Source: Soy beans

I. Morphology
1. Vegetative cells
    Usual limits of length: 2.2-9.5$\mu$; of diameter 0.8-3.6$\mu$
    Size of majority: 5.0 x 1.5$\mu$
3. Endospores
    Usual limits of length 2.1-3.9$\mu$; of diameter 1.3-1.8$\mu$
    Size of majority: 1.5 x 2.9$\mu$ III. Physiological characteristics
9. Fermentation reactions
    (a) Acid and gas production

| Carbohydrate or alcohol | Acid production | Gas production |
|---|---|---|
| Arabinose | +++ | ++ |
| Fructose | +++ | +++ |
| Galactose | +++ | +++ |
| Mannose | +++ | +++ |
| Lactose | +++ | ++ |
| Sucrose | +++ | +++ |
| Maltose | +++ | ++ |
| Raffinose | ++ | ++ |
| Soluble starch | +++ | +++ |
| Dextrin | +++ | ++ |
| Glycogen | +++ | ++ |

(b) Molasses fermentation
    Butyl alcohol ratio: 65-74%
    Acetone ratio: 24-29%

The outstanding characteristics of these bacteria from a commercial standpoint is their ability to produce consistently yields of 27-33% of butyl alcohol, acetone, and ethyl alcohol, from mashes containing from 65 to 75 grams of fermentable sugar per liter, as opposed to yields not consistently above 25-26% obtainable in such mashes with previously known bacteria. In determining this characteristic a mash should be utilized which contains the necessary nutrients for the bacteria, and the mash should be maintained under optimum temperature and pH conditions throughout the fermentation. A healthy active culture of bacteria should be employed and the usual precautions should be taken as to sterilizing the mash, avoiding contamination, and the like. A medium such as the molasses medium illustrated in the fermentation reactions above may suitably be employed for this test, but, in view of possible variations due to differences in the composition of molasses samples from various sources, it may be desirable to employ for this test a synthetic medium such as the following:

| | Grams per liter |
|---|---|
| Sucrose | 50 |
| Glucose | 25 |
| Calcium carbonate | 6 |
| Ammonium sulphate | 6 |
| Dipotassium phosphate | 1 |
| Monopotassium phosphate | 1 |
| Magnesium sulphate | 1.5 |
| Yeast water (10% concentration) | 10% by volume |

While the yield values given in the fermentation reactions above are characteristic of the bacteria in the particular mashes and under the particular conditions specified, it is to be understood that considerable variation may be expected if these conditions are appreciably changed. As has previously been noted, various samples of molasses of the same general type may be found to give different yields with the same culture of bacteria. Likewise, different types of molasses will often be found to give substantially different yields. For example, beet molasses generally gives considerably higher yields of solvents than any of the types of cane molasses. It will also be found that supplementary nutrients, such as distillation slop from a yeast fermentation of a saccharified grain mash, may affect the yield. Nutrients of this type tend, in general, to increase the yield obtainable. Similarly, if ammonia is utilized in place of calcium carbonate to regulate the pH of the mash throughout the fermentation, the yield tends to be increased.

The solvent ratio produced by the bacteria will also depend on a number of factors, especially the composition of the mash. Different acetone ratios may be secured with different types of molasses. Puerto Rican molasses, for example, generally gives somewhat higher acetone ratios than Cuban molasses. The use of supplementary nutrients, such as yeast distillation slop, generally increases the acetone ratio and ammonia neutralization tends to give acetone ratios different from those obtained with calcium carbonate neutralization. All of these variables give rise to a rather broad range of solvent ratios obtainable with these bacteria, which may even exceed the average ranges indicated above, but it should be understood that a considerably narrower range of solvent ratio is usually secured with any particular culture if the mash composition and fermentation conditions are not varied.

The bacteria of the present invention have certain requirements as to nutrients and pH conditions which must be satisfied to secure optimum yields in the fermentation. For example, these bacteria require degraded protein nitrogen for optimum fermentation. The term degraded protein nitrogen as used here includes intermediate degradation products such as polypeptides, amino acids, etc., and the final degradation product, ammonia, and its salts. Ammonia (or an ammonium compound, such as ammonium sulphate) alone has been found to give satisfactory yields of solvents but it is preferred to use a mixture of ammonia and a higher form of nitrogenous material such as yeast water, steep water, distillation slop, or the like. These bacteria likewise require phosphate nutrients, as in the case of most other types of bacteria. Many natural sources of carbohydrate, such as molasses, contain sufficient phosphates but in case of deficiency this may be supplied in the form of calcium acid phosphate or any of the other common phosphates employed for this purpose.

The amount of nitrogenous and mineral nutrients to be incorporated in the mash will, of course, depend to a certain extent upon the type of material employed as a source of carbohydrate. The particular optimum amounts for any type of mash can readily be determined by simple preliminary experiments. However, it may be said that, in general, from 4 to 6% of ammonium sulphate or its equivalent, and preferably approximately 5%, based on the weight of the carbohydrate in the mash, and from 0.2% to 0.6% and preferably 0.3% of calcium acid phosphate, or its equivalent, should be employed in mashes prepared from high test molasses, or other carbohydrate material low in nutrient content. Smaller amounts may, of course, be employed in the case of other raw materials which naturally contain greater amounts of nitrogenous and mineral nutrients.

It will be noted that the bacteria as described above have an optimum finel pH within the range 5.6 to 6.2. It should be understood, of course, that this is merely an optimum range and that high yields are obtainable with a much wider range of final pH. We prefer to control the acidity of the mash during the fermentation whereby the final pH secured by the action of the bacteria falls within the range pH 5.2–6.4. However, under certain conditions, particularly in large scale operations utilizing mashes containing high test molasses and buffering materials in addition to neutralizing agents, high yields may be obtained with final pH values considerably below 5.2. Similarly, in certain types of mashes high yields may be obtained with final pH values considerably above 6.4. The control of the hydrogen ion concentration to secure a final pH within the desired range may be effected by supplying alkaline neutralizing agents to the fermenting mash throughout the fermentation. The neutralizing agents may be supplied throughout the fermentation either by continuous or semi-continuous addition of soluble neutralizing agents such as ammonium hydroxide, or by incorporating into the initial mash an excess of an insoluble neutralizing agent, such as calcium carbonate. If the former procedure is employed, the ammonium hydroxide will serve the dual function of neutralizing agent and nitrogenous nutrient, thus avoiding the necessity of incorporating an ammonium salt in the mash. If calcium carbonate, or other insoluble non-toxic basic neutralizing agent, is employed to control the hydrogen ion concentration of the fermenting mash, such material should usually be incorporated in the mash in amounts of from 2 to 10%, and preferably approximately 5%, based on the weight of the carbohydrate in the mash, in excess of that required to neutralize any initial acidity. Equivalent amounts of calcium acetate, calcium butyrate, or other soluble salts of a fermentable organic acid and a soluble or insoluble base, may be employed in place of the insoluble neutralizing agent. If ammonia is employed as the neutralizing agent, this should usually be incorporated in the mash in amounts of from 1 to 2% of $NH_3$, and preferably approximately 1.4%, based on the weight of the carbohydrate in the mash. These amounts of neutralizing agents, however, are not critical and may vary somewhat depending upon the alkali or buffer content of the mash. Here again one skilled in the art may readily determine the optimum concentration for a given mash by simple preliminary experiments.

In adjusting the nutrients or providing the necessary acidity control for a given mash, it will, of course, be evident that variations in the materials utilized as sources of carbohydrates should be taken into account. For example, in the case of beet molasses or certain samples of Hawaiian molasses, nutrient content and ash are considerably higher than commonly encountered with Cuban molasses, with the result that a considerable portion of the required neutralizing agents and nutrients are already present in the raw material. For example, in the case of either of these materials it may be found to be unnecessary to supply any additional neutralizing agent, and in the case of beet molasses it is usually unnecessary to supply any additional nitrogenous nutrient. Those skilled in the art can readily adapt mashing procedures to the various types of raw materials employed, and simple preliminary experiments will indicate the optimum conditions.

It is, of course, to be understood that in employing the bacteria of our present invention the usual precautions employed by those skilled in the art in processes of this nature should be employed. For optimum results the final fermentation mash should be inoculated with a suitable concentration, e. g., from 1 to 5% by volume, of a very actively fermenting culture. The inoculant developed for this purpose should preferably be at the height of its activity at the time of inoculation. Similarly, the mashes utilized in the fermentation process should not be heated for unduly long periods during sterilization, or sterilized at unduly high temperatures, in view of the possible adverse effect of such procedures on the yields obtained. The usual precautions as to avoidance of contamination will insure continued operation with satisfactory results, although the bacteria of the present invention may be employed for the fermentation of unsterilized mashes if proper precautions as to cleanliness are taken, and an unusually high concentration of contaminating organisms does not build up in any part of the apparatus.

The bacteria of the present invention may be isolated from natural sources, such as soil, grain, vegetable seeds, etc., in accordance with known procedures of isolation, such as enrichment culturing in favorable media, plating on solid media, picking single cells with micropipettes, or combinations of these procedures. Isolation procedures commonly used in the past for essentially sugar fermenting butyl alcohol producing bacteria may be successfully employed for securing cultures of the present strains of bacteria, and cultures thus obtained may then be tested for the characteristics listed above.

The following is illustrative of one method of isolation which has been successfully employed for securing cultures of the bacteria of the present invention. Samples of vegetable seeds, such as soy beans or the like, are macerated in sterile water, and the resulting mixture is pasteurized by heating at 57° C. for 35 minutes, and then incubated at 30° C. for 96 hours. The resulting cultures are then transferred to tubes of the potato glucose medium previously described, heated for 1½ minutes at 100° C., cooled immediately, and incubated at 30° C. for 24 hours. These tubes are then transferred to molasses mash of the type previously described, and the cultures showing the most active fermentation are then plated according to standard procedure on agar medium comprising 17 gm. agar, 20 gm.

glucose, 8 gm. molasses, 5 gm. peptone, 3 gm. beef extract, and 1 gm. of ammonium sulphate per liter. This agar, after sterilization, should have a pH not lower than 6.8, and preferably in the neighborhood of 7.0. After anaerobic incubation for 72 hours, colonies from these plates are inoculated into potato glucose medium and incubated at 30° C. for a week or longer to insure sporulation of the cultures. These cultures are then tested for the characteristics listed above, and those showing promising yields may then be further purified by additional plating or by picking single cells if desired.

It will, of course, be understood that the above procedure is illustrative only, and that any suitable isolation procedure commonly employed for bacteria of this general nature may be employed. Likewise, it should be understood that bacteria of this group cannot be obtained from every particular sample of soil, vegetable seeds, or other material which is tested, but that if a sufficiently large number of different natural sources are utilized the desired bacteria will be obtained.

Our invention will now be illustrated by specific examples in which different types of mashes are fermented with the strains of bacteria described above.

*Example I*

A mash containing 73 gm. sugar, calculated as sucrose, in the form of Cuban molasses, 3.6 gm. ammonium sulphate, 4.0 gm. calcium carbonate, and 0.5 gm. calcium acid phosphate per liter of mash, was inoculated with an active culture of *Clostridium saccharo-butyl-acetonicum-liquefaciens-gamma* and incubated at 30° C. for 47 hours. The following results were obtained:

| Final pH | Solvent yield, percent of sugar | Solvent ratio | | |
|---|---|---|---|---|
| | | Percent BuOH | Percent acetone | Percent EtOH |
| 6.02 | 31.7 | 60.9 | 34.6 | 4.5 |

*Example II*

A mash containing 65 gm. sugar, calculated as sucrose, in the form of Cuban molasses, 3.3 gm. ammonium sulphate, 3.9 gm. calcium carbonate, and 0.2 gm. calcium acid phosphate per liter of mash, was inoculated with an active culture of *Clostridium saccharo-butyl-acetonicum-liquefaciens-delta* and incubated at 30° C. for 36 hours. The following results were obtained:

| Solvent yield, percent of sugar | Solvent ratio | | |
|---|---|---|---|
| | Percent BuOH | Percent acetone | Percent EtOH |
| 29.4 | 68.7 | 26.8 | 4.5 |

*Example III*

A mash containing 79 gm. sugar, calculated as sucrose, in the form of Cuban molasses, 4.0 gm. ammonium sulphate, and 4.8 gm. calcium carbonate per liter of mash, and containing 20% by volume of screened distillation slop from a yeast fermentation of a saccharified grain mash, was inoculated with an active culture of *Clostridium saccharo-butyl- acetonicum -liquefaciens-gamma* and incubated at 30° C. for 37 hours. The following results were secured:

| Solvent yield, percent of sugar | Acetone ratio, percent total solvents |
|---|---|
| 30.4 | 34.2 |

*Example IV*

A mash containing 70 gm. sugar, calculated as sucrose, in the form of high test Cuban molasses (75.5% sugar content), and 20% by volume of screened distillation slop from a yeast fermentation of a saccharified grain mash, was inoculated with an active culture of *Clostridium saccharo-butyl-acetonicum-liquefaciens-gamma* and incubated at 30° C. for 40 hours. At the time of inoculation ammonia was added to the mash in an amount sufficient to adjust the pH to 5.9–6.0. When fermentation had progressed to the point at which the pH had dropped to 5.4, hourly additions of ammonia were made for the next nine hours. The total ammonia added constituted 1.4% of NH₃ based on the weight of the sugar in the mash. Approximately 10% of this quantity was added to the original mash to adjust the pH to 5.9–6.0 and the remainder was added according to the following schedule: 6% total NH₃ at first hourly addition, 7% at second hourly addition, etc., increasing 1% until the ninth addition at which the remainder was added. The following results were secured:

| Solvent yield, percent of sugar | Solvent ratio | | |
|---|---|---|---|
| | Percent BuOH | Percent acetone | Percent EtOH |
| 31.3 | 62.4 | 33.6 | 4.0 |

*Example V*

A mash containing 74 gm. sugar per liter, calculated as sucrose, in the form of Cuban molasses (50% sugar content), and 30% by volume of screened distillation slop from a yeast fermentation of saccharified grain mash, was inoculated with an active culture of *Clostridium saccharo-butyl-acetonicum-liquefaciens-delta* and incubated at 30° C. for 44 hours. Ammonia neutralization was effected in accordance with the following schedule: A total of 1.4% NH₃, based on the weight of the sugar, was added, 8% of the total being added when the pH of the fermenting mash first reached a value of 5.0 and the remainder being added in three additions at four hour intervals, the three additions constituting 24%, 32%, and 36%, respectively, of the total. The following results were secured:

| Final pH | Solvent yield, percent of sugar | Solvent ratio | | |
|---|---|---|---|---|
| | | Percent BuOH | Percent acetone | Percent EtOH |
| 6.0 | 31.5 | 69.2 | 27.7 | 3.1 |

It will be noted from the above examples that satisfactory yields of solvents may be obtained from various types of mashes with the bacteria of the present invention, utilizing, in general, higher sugar concentration mashes and shorter fermentation schedules than can be employed with previously known bacteria. It should be noted that the incubation times given in the above examples actually represent time elapsed before analysis of the fermented mash rather than actual time for completed fermentation. With the organisms of the present invention the fermentation can usually be completed in less than 40 hours, and with certain mashes the fermentations can consistently finish in 29 to 30 hours. This represents less than half of the time usually required for previous fermentations of this type. It may also be seen that the bacteria of the present invention are advantageous from the standpoint of the solvent ratios produced. Both of these strains of bacteria produce high percentages of butyl alcohol, and yet there is a sufficient difference between the solvent ratios of the two strains so that alternate use of both strains may be employed to maintain balanced inventories of butyl alcohol and acetone.

It should be understood that our invention is not to be construed as limited to the fermentation of mashes containing from 65 to 75 grams of sugar per liter. It may be seen from Example III above that very satisfactory yields are obtainable from mashes containing approximately 80 grams of sugar per liter, and with certain types of molasses it is possible to obtain consistently high yields with mashes containing 85 to 90 grams of sugar per liter. Mashes containing 100 grams or more of sugar per liter can be fermented with only slightly reduced yields. It is therefore to be understood that our invention is applicable to the fermentation of mashes of various sugar concentrations, although an identifying characteristic of the bacteria constitutes their ability to produce specified yields from mashes containing from 65 to 75 grams of sugar per liter.

It is also to be understood, of course, that the examples given above are illustrative only and that our invention is not to be construed as limited to the particular procedures specified. Likewise, our invention applies to all bacteria having the characteristics of the two strains described above, irrespective of any additional characteristics which they may possess. Also our invention is applicable to the fermentation of mashes containing any fermentable carbohydrate, and to the use of any suitable nutrients or neutralizing agents other than, or in addition to, those specifically mentioned in the examples. The fermentation procedure may be modified in any respect as long as suitable nutrients are provided, and temperature and pH conditions are maintained throughout the fermentation within operative ranges for the particular bacteria employed. In general, it may be said that the use of any equivalents or modifications of procedure which would naturally occur to one skilled in the art is included within the scope of our invention.

Our invention now having been described, what we claim is:

1. A process for the production of butyl alcohol, acetone, and ethyl alcohol which comprises subjecting a fermentable carbohydrate mash chosen from the class consisting of nutrient starch mashes and nutrient sugar mashes to the action of bacteria of the group consisting of *Clostridium saccharo-butyl-acetonicum-liquefaciens-gamma* and *Clostridium saccharo-butyl-acetonicum-liquefaciens-delta*.

2. A process for the production of butyl alcohol, acetone, and ethyl alcohol which comprises subjecting a mash containing sucrose as a principal source of carbohydrate and an ammonium compound as a principal source of nitrogenous nutrient, to the action of bacteria of the group consisting of *Clostridium saccharo-butyl-acetonicum-liquefaciens-gamma* and *Clostridium saccharo-butyl-acetonicum-liquefaciens-delta*.

3. A process for the production of butyl alcohol, acetone, and ethyl alcohol which comprises subjecting a mash containing sucrose as a principal source of carbohydrate and an ammonium compound as a principal source of nitrogenous nutrient, to the action of bacteria of the group consisting of *Clostridium saccharo-butyl-acetonicum-liquefaciens-gamma* and *Clostridium sacchro-butyl-acetonicum-liquefaciens-delta*, and controlling the acidity during the acid producing stage of the fermentation to maintain a hydrogen ion concentration favorable to the production of neutral rather than acidic end products.

4. A process for the production of butyl alcohol, acetone, and ethyl alcohol which comprises subjecting a mash containing sucrose as a principal source of carbohydrate to the action of bacteria of the group consisting of *Clostridium saccharo-butyl-acetonicum-liquefaciens-gamma* and *Clostridium saccharo-butyl-acetonicum-liquefaciens-delta*, providing in said mash nitrogenous nutrient in the form of an ammonium compound, and supplying alkaline neutralizing agents to the fermenting mesh to control the hydrogen ion concentration whereby the final pH secured by the action of the bacteria falls within the range 5.2–6.4.

5. A process for the production of butyl alcohol, acetone, and ethyl alcohol which comprises subjecting a molasses mash to the action of bacteria of the group consisting of *Clostridium saccharo-butyl-acetonicum-liquefaciens-gamma* and *Clostridium saccharo-butyl-acetonicum-liquefaciens-delta*, providing in said mash nitrogenous nutrient in the form of an ammonium compound, and supplying alkaline neutralizing agents to the fermenting mash to control the hydrogen ion concentration whereby the final pH secured by the action of the bacteria falls within the range 5.2–6.4.

6. A process for the production of butyl alcohol, acetone, and ethyl alcohol which comprises subjecting a molasses mash to the action of bacteria of the group consisting of *Clostridium saccharo-butyl-acetonicum-liquefaciens-gamma* and *Clostridium saccharo-butyl-acetonicum-liquefaciens-delta*, providing in said mash nitrogenous nutrient in the form of an ammonium compound, and providing calcium carbonate in a concentration slightly in excess of that required to neutralize any initial acidity of the mash, whereby the final pH secured by the action of the bacteria falls within the range 5.6–6.2.

7. A process for the production of butyl alcohol, acetone, and ethyl alcohol which comprises subjecting a molasses mash to the action of bacteria of the group consisting of *Clostridium saccharo-butyl-acetonicum-liquefaciens-gamma* and *Clostridium saccharo-butyl-acetonicum-liquefaciens-delta*, and supplying ammonium hydroxide to the fermenting mash in the form of a number of small additions distributed during the acid producing stage of the fermentation to control the hydrogen ion concentration whereby the final pH secured by the action of the bacteria falls within the range 5.6–6.2.

8. A process for the production of butyl alcohol, acetone, and ethyl alcohol which comprises subjecting a molasses mash to the action of bacteria of the group consisting of *Clostridium saccharo-butyl-acetonicum-liquefaciens-gamma* and *Clostridium saccharo-butyl-acetonicum-liquefaciens-delta*, and supplying ammonium hydroxide to the fermenting mash in an amount approximately equivalent to 1.4% $NH_3$, based on the weight of the sugar in the mash, the said ammonium hydroxide being incorporated in the fermenting mash in the form of approximately ten additions of increasing amounts distributed during the acid producing stage of the fermentation.

EDWIN H. CARNARIUS.
WINFRED N. McCUTCHAN.